UNITED STATES PATENT OFFICE.

THOMAS BAILEY WALKER, OF AUSTIN, TEXAS.

STOCK FOOD AND METHOD OF PREPARING THE SAME.

1,140,638.　　　Specification of Letters Patent.　　Patented May 25, 1915.

No Drawing.　　Application filed May 29, 1913. Serial No. 770,736.

*To all whom it may concern:*

Be it known that I, THOMAS BAILEY WALKER, a citizen of the United States, residing at Austin, in the county of Travis and State of Texas, have invented certain new and useful Improvements in Stock Food and Methods of Preparing the Same, of which the following is a specification.

This invention relates to the process of manufacturing stock feed from organic matter containing cellulose and the products resulting from this process.

Broadly stated, my invention consists of treating finely divided organic matter containing cellulose with certain acids under pressure, thereby freeing the cellulose and other carbohydrates from various resistive incrusting substances by breaking up the latter and rendering the cellulose porous, friable and converting a part of the cellulose into glucoses and other carbohydrates which may be more readily absorbed by an animal in feeding.

The object of this invention is to produce at a low cost a stock food of greater food value from waste materials containing cellulose, such as sawdust, wood, tanbark, grasses, husks and hulls of grain and plants, bagasse, straws, stalks of plants, low grade fibrous hays, etc., a large number of which have very little real nutritive feeding value, for the reason that the cellulose and other carbohydrates are held together with incrusting substances and in this resistive form practically pass through an animal unchanged, simply giving bulk and waste when mixed with other more assimilable and concentrated foods. In my invention the cellulose and other carbohydrates are entirely dissociated from the various incrusting substances, the whole mass being rendered porous and friable, while a part of the cellulose is converted into glucose and other carbohydrates of a much greater nutritive feeding value, thereby converting a material of very low food value into one which can readily be absorbed by an animal in feeding with the minimum of waste.

With this object in view, my invention consists in the matter to be hereinafter described and claimed.

The process of manufacture can be carried out in several ways, but it is expressly to be understood that the process may be varied to meet the different conditions desired in the finished product and the different classes of materials to be treated. In general practice the material is treated as hereinafter described.

In carrying my invention into practical effect the organic matter containing cellulose is reduced to a fine state of division in any suitable manner by crushing, grinding or shredding. Should excessive amounts of tannin be present the same is removed by leaching in the usual way. The mass is then treated with a suitable acid liquor under pressure and in process of heating incrusting substances are broken up and any resinous matter is eliminated, the mass is rendered more porous, friable and absorbent and a part of the cellulose is converted into glucoses and other carbohydrates. After neutralization with an alkali the saccharine liquid is preferably drawn off and evaporated in a triple effect and then returned to the treated product or the whole mass may be evaporated together in any suitable evaporating apparatus.

By using hydrochloric acid in this process instead of sulfurous or sulfuric acid and neutralizing with caustic soda I obtain salt which makes the food more palatable than when lime is used as a neutralizing agent.

While the food described is a complete product, it will be understood that it may be mixed with other foods, to suit the views of different users, or the condition of the stock to be fed.

Claims.

1. The process of making stock food consisting in subjecting comminuted cellulose waste materials to the action of acid liquors under heat and pressure thereby breaking up resistive incrusting substances of the cellulose, partially converting the cellulose into saccharine bodies and rendering the material porous and friable, then removing the moisture as described.

2. The process of making stock food consisting in subjecting comminuted cellulose waste materials to the action of acid liquors under heat and pressure thereby breaking up resistive incrusting substances of the cellulose, partially converting the cellulose into saccharine bodies and rendering the material porous and friable, freeing from the resulting product any resinous bodies and then removing the moisture as described.

3. The process of making stock food consisting in subjecting cellulose to the action of a hydrolyzing solution to partially convert the cellulose into saccharine bodies and render the fiber friable, separating the solid from the liquid portion, evaporating the latter and incorporating the evaporated product with said solid portion.

4. The process of making stock food from cellulose containing incrusting substances, consisting in subjecting the cellulose in comminuted condition to a liquor containing hydrochloric acid in the presence of heat and pressure to hydrolyze the same and break up the incrusting bodies, neutralizing the acidity by an alkaline sodium compound and then removing the moisture.

5. The process of making stock food from cellulose containing incrusting substances, consisting in subjecting the cellulose in comminuted condition to an acid liquor under heat and pressure to hydrolyze the same and break up incrusting bodies, adding an alkali to neutralize excess of acidity, and then removing the moisture.

6. A stock food prepared from cellulose waste materials characterized by containing deincrusted cellulose in partially hydrolyzed condition, the material being porous, friable and readily assimilated by an animal in feeding.

In testimony whereof I affix my signature in presence of two witnesses.

THOMAS BAILEY WALKER.

Witnesses:
C. A. NEALE,
C. E. FETZER.